US012394562B2

(12) United States Patent
Wang et al.

(10) Patent No.: US 12,394,562 B2
(45) Date of Patent: Aug. 19, 2025

(54) DRY TRANSFORMER

(71) Applicant: Hitachi Energy Ltd, Zürich (CH)

(72) Inventors: Yong Wang, Brilon (DE); Wolfgang Mönig, Brilon (DE); Frank Cornelius, Brilon (DE); Jens Tepper, Wolfenbüttel (DE)

(73) Assignee: Hitachi Energy Ltd, Zurich (CH)

( * ) Notice: Subject to any disclaimer, the term of this patent is extended or adjusted under 35 U.S.C. 154(b) by 1120 days.

(21) Appl. No.: 17/297,762

(22) PCT Filed: Oct. 22, 2019

(86) PCT No.: PCT/EP2019/078642

§ 371 (c)(1),
(2) Date: May 27, 2021

(87) PCT Pub. No.: WO2020/108867

PCT Pub. Date: Jun. 4, 2020

(65) Prior Publication Data

US 2022/0044863 A1 Feb. 10, 2022

(30) Foreign Application Priority Data

Nov. 29, 2018 (EP) .................................... 18209219

(51) Int. Cl.
*H01F 27/32* (2006.01)
*H01F 27/06* (2006.01)
*H01F 27/30* (2006.01)

(52) U.S. Cl.
CPC ........... *H01F 27/327* (2013.01); *H01F 27/06* (2013.01); *H01F 27/306* (2013.01); *H01F 2027/328* (2013.01)

(58) Field of Classification Search
CPC ........ H02G 3/08; H02G 3/081; H01F 27/327; H01F 27/06; H01F 27/306; H01F 27/28; H01F 2027/328
(Continued)

(56) References Cited

U.S. PATENT DOCUMENTS 4,523,171 A * 6/1985 Altmann ............... H01F 27/327 336/60
6,160,464 A 12/2000 Clarke et al.
(Continued)

FOREIGN PATENT DOCUMENTS

CN 207183043 U 4/2018
EP 2549495 A1 1/2013
(Continued)

OTHER PUBLICATIONS

First Chinese Office Action for Chinese Patent Application No. CN 201980078988.4 mailed on May 12, 2023, 13 pages (including English translation).
(Continued)

*Primary Examiner* — Angel R Estrada
(74) *Attorney, Agent, or Firm* — Sage Patent Group

(57) ABSTRACT

A dry transformer to be mounted on or under or in a vessel or means of transportation, in particular a rail car or power car of a train or a ship, includes at least one core and at least one winding. The winding surrounds the core and the core and the winding are parts of a coil. The coil and/or the core and/or the winding are mechanically connected to an outer support structure by at least one strut. The transformer is able to master the required typical dynamic loads in at least one direction in transportation applications, such as railway applications.

13 Claims, 6 Drawing Sheets

Figure 1:
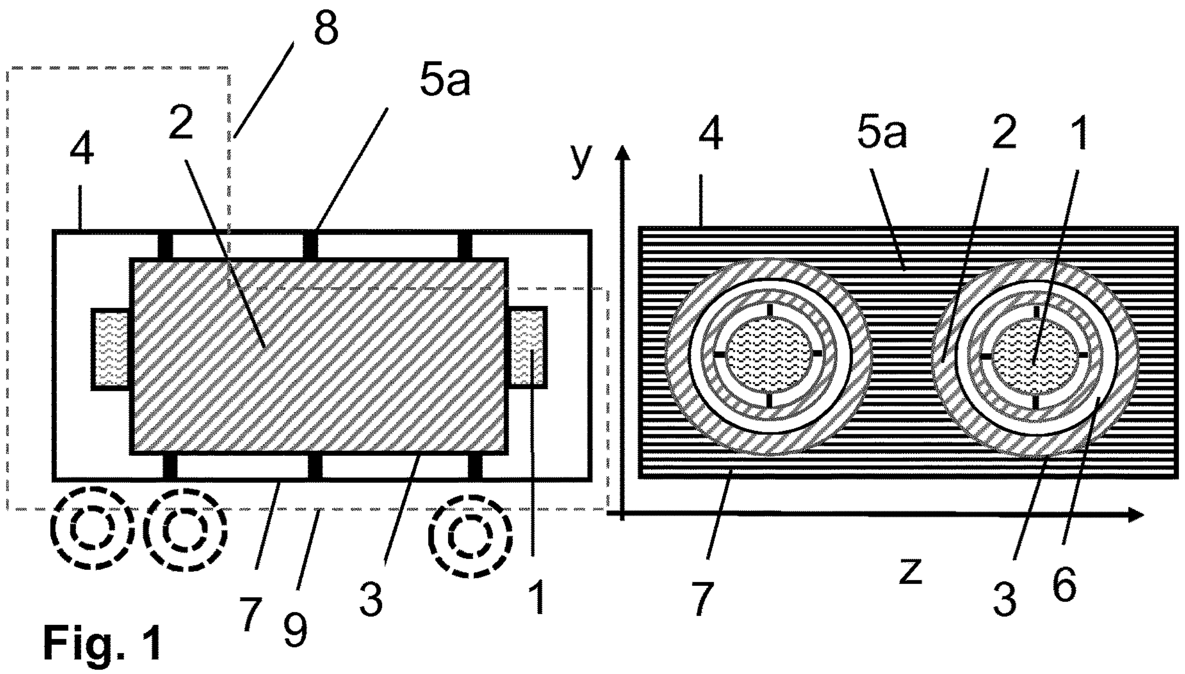

(58) Field of Classification Search
USPC .... 174/50, 520, 535; 220/3.2, 3.3, 3.8, 4.02; 361/600, 601; 336/58, 60, 82, 90, 207, 336/65, 68, 20, 41
See application file for complete search history.

(56) References Cited

U.S. PATENT DOCUMENTS

| | | | | |
|---|---|---|---|---|
| 6,642,829 | B1 * | 11/2003 | Carmena | H01F 38/16 363/128 |
| 8,188,823 | B2 * | 5/2012 | Le | H01F 27/02 336/84 R |
| 8,284,006 | B2 * | 10/2012 | Bacarisse | H01F 27/085 336/90 |
| 8,884,732 | B2 * | 11/2014 | Johnson | H01F 27/02 336/55 |
| 8,952,777 | B2 * | 2/2015 | Weber | H01F 27/085 336/84 R |
| 9,368,268 | B2 * | 6/2016 | Luckey | H01F 27/06 |
| 9,761,366 | B2 | 9/2017 | Weber et al. | |
| 2017/0213633 | A1 | 7/2017 | Weber et al. | |

FOREIGN PATENT DOCUMENTS

| | | | |
|---|---|---|---|
| EP | 2869313 | A1 | 5/2015 |
| EP | 3007189 | A1 | 4/2016 |
| EP | 3091543 | A1 | 11/2016 |
| WO | 2015004738 | A1 | 2/2017 |

OTHER PUBLICATIONS

International Search Report and Written Opinion of the International Searching Authority, PCT/EP2019/078642, mailed Mar. 24, 2020, 21 pages.

Extended European Search Report mailed Jun. 4, 2019 for European Patent Application No. 18209219.7, 13 pages.

* cited by examiner

DRY TRANSFORMER

CROSS REFERENCE TO RELATED APPLICATIONS

This application is a 35 U.S.C. § 371 national stage application of PCT International Application No. PCT/EP2019/078642 filed on Oct. 22, 2019, which in turns claims foreign priority to European Patent Application No. 18209219.7, filed on Nov. 29, 2018, the disclosures and content of which are incorporated by reference herein in their entirety.

DESCRIPTION

The invention is related to a dry transformer to install on or under or in a means of transportation or vessel, in particular a rail car or power car of a train or a ship, comprising at least one core and at least one winding, wherein the winding surrounds the core and wherein the core and the winding are parts of a coil.

In a transformer of dry type the dielectric insulation is a gaseous medium, a solid medium or comprises a combination of both media. The cooling of the dry transformer may be realized by a gaseous medium or by a liquid medium. The transformer core may have a round, stepped, oval cross-sectional or a rectangular cross-sectional area.

Currently such a dry transformer often is assembled using a core and different coil parts. The coil parts are manufactured separately. Currently an assembled dry transformer often is not able to master the required typical dynamic loads in x- y- z-directions in railway applications.

The object of the invention therefore is to create a transformer, which is able to master the required typical dynamic loads in at least one direction in transportation application and in particular in rolling stock applications, like for example in railway applications.

The object of the invention is achieved by means of the features of claim 1.

According to this claim the coil and/or the core and/or the winding are mechanically connected to an outer support structure by at least one strut.

According to the invention it has been found that a dry transformer, in particular a traction transformer, may be used for the placement on, under or in a means of transportation or vessel, in particular a rail car or power car or wagon of a train or in or on a ship, in particular in or under or on a machine room of a rail car or power car of a train. It has been found that all coils and/or windings and/or cores must be mounted in such a way that the required typical dynamic loads can be received in x- y- z-directions in transportation applications and in particular rolling stock or railway applications. This is realized by one strut or several struts which is or are connected with an outer support structure. The outer support structure preferably is a part of the transformer. The outer support structure may be a part of the rail car or power car.

Advantageously, the strut is made of an electrically insulating material or the strut comprises an electrically insulating material. The strut is not electrically conductive. Through this, staff can be protected. Coils are fixed by means of insulation material to an outer support structure.

Further advantageously, the strut comprises at least one plate, which has at least one opening or at least one recess, which at least partially surrounds the coil and/or an outer winding of the coil and/or the core. Through this, forces exerted by the coil can be absorbed or received in two directions.

Advantageously, the strut comprises two plates at one longitudinal end of the coil and comprises two plates at the other longitudinal end of the coil. Through this, forces exerted by the coil can be absorbed or received in two directions at both ends of the coil in an effective manner.

Further advantageously, the strut is comb-shaped and/or the strut at least partially extends in a direction, which is parallel to the longitudinal extension of the core. Through this, forces exerted by the coil in the longitudinal direction of the core can be absorbed or received. The comb-shaped strut preferably comprises fins which engage into the winding or in a space between two windings.

Advantageously, the strut is comb-shaped at one longitudinal end of the coil and that the strut is comb-shaped at the other longitudinal end of the coil. Through this, forces exerted by the coil in the longitudinal direction of the core can be absorbed or received at two ends of the coil.

Further advantageously, the strut at one if its ends is connected with the coil or the winding on at least one outer side of the coil or the winding and the strut is connected at its other end with the outer support structure. Through this, forces exerted by the coil in one direction of the core can be absorbed or received by an outer support structure in an effective manner.

Advantageously, the strut protrudes with one first leg from one side of the coil or the winding and protrudes with one second leg from another side of the coil or the winding, wherein the directions of protruding of the legs are perpendicular to each other. Through this, forces exerted by the coil in two directions can be absorbed or received.

Further advantageously, the winding is wound directly onto the core. A winding, which lies at the core, can be wound directly on the core.

Advantageously, the winding is connected to the core and/or the winding is wedged to the core. A winding, which lies at the core, can be wedged or connected to the core.

Further advantageously a winding, which lies at the core, can be connected to brackets on a support structure.

Further advantageously, concentric superimposed windings are supported by structural devices with or against each other and/or are connected to a support structure. All windings can also be individually connected to a support structure. The structural devices between two windings can also be connected with a strut, wherein the strut is connected to an outer support structure.

Further advantageously, several coils and/or windings and/or cores are arranged in parallel to each other and in parallel to a horizontally oriented plane. Advantageously, the coils are arranged horizontally. In a horizontal arrangement, the coils can be located next to each other or one above the other. The coils can be arranged horizontally depending on the required application. This can be realized at the possible mounting locations of the transformer, e.g. under the wagon, on the wagon and in the engine room of the wagon of a train.

Advantageously, several coils and/or windings and/or cores are arranged in parallel to each other and perpendicularly to a horizontally oriented plane. Advantageously, the coils are arranged vertically. The coils can be arranged vertically depending on the required application. This can be realized in the possible mounting locations of the transformer, e.g. under the wagon, on the wagon and in the engine room of the wagon of a train.

Further advantageously, an arrangement comprises a transformer as described above and a vessel or means of transportation, in particular a rail car or a power car of a train, wherein the vessel or means of transportation, in particular a rail car or power car, comprises a ground plane which is arranged almost horizontally, in particular which is arranged parallel to the rails or trackway, when the rail car or power car is on the rails, and wherein the coil and/or the winding and/or the core is/are oriented in parallel to the ground plane.

Advantageously, an arrangement comprises a transformer as described above and a rail car or a power car of a train, wherein the rail car or power car comprises a ground plane which is parallel to the rails, when the rail car or power car is on the rails, and wherein the coil and/or winding and/or the core is/are oriented perpendicularly to the ground plane.

Further advantageously, the support structure is connected to the vessel or the means of transportation, in particular the rail car or power car or ship, in a fixed manner. Advantageously the outer support structure fixes at least one coil in three directions, namely in x-direction, in y-direction and in z-direction. Through this, the transformer can be used in transportation applications and in particular in railway applications.

Advantageously, the transformer has different windings on at least one core leg, wherein a second core leg conducts the magnetic return flow. Advantageously, the transformer has different windings on two or three core legs.

The transformer described here is a dry-transformer. A dry-type transformer described here, especially is used for a rolling stock application or a railway application. A transformer can be cooled using a ventilator.

Figure 2:
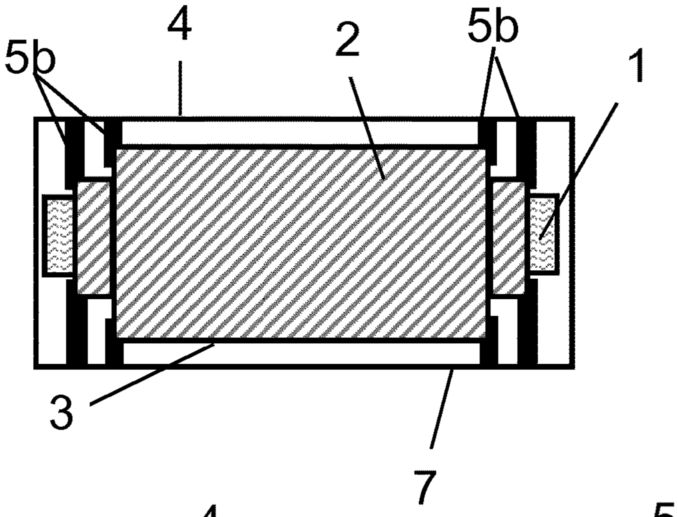
Figure 3:
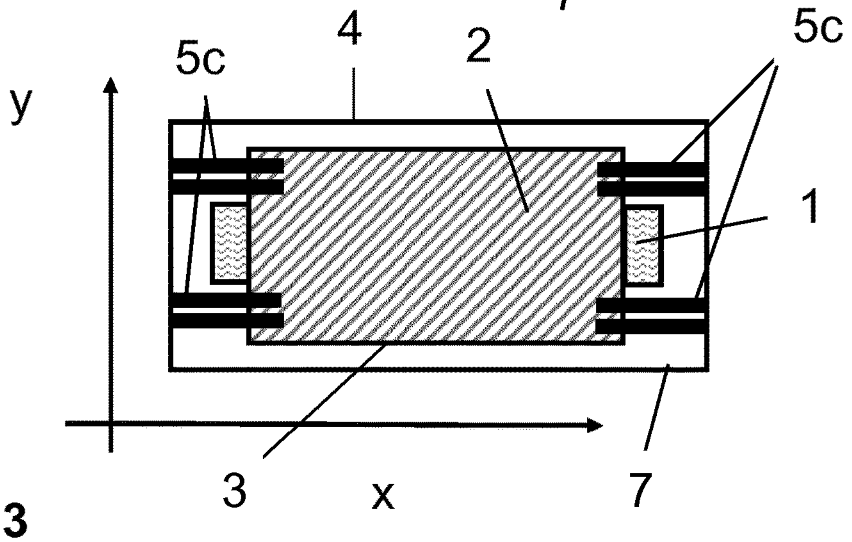
Figure 4:
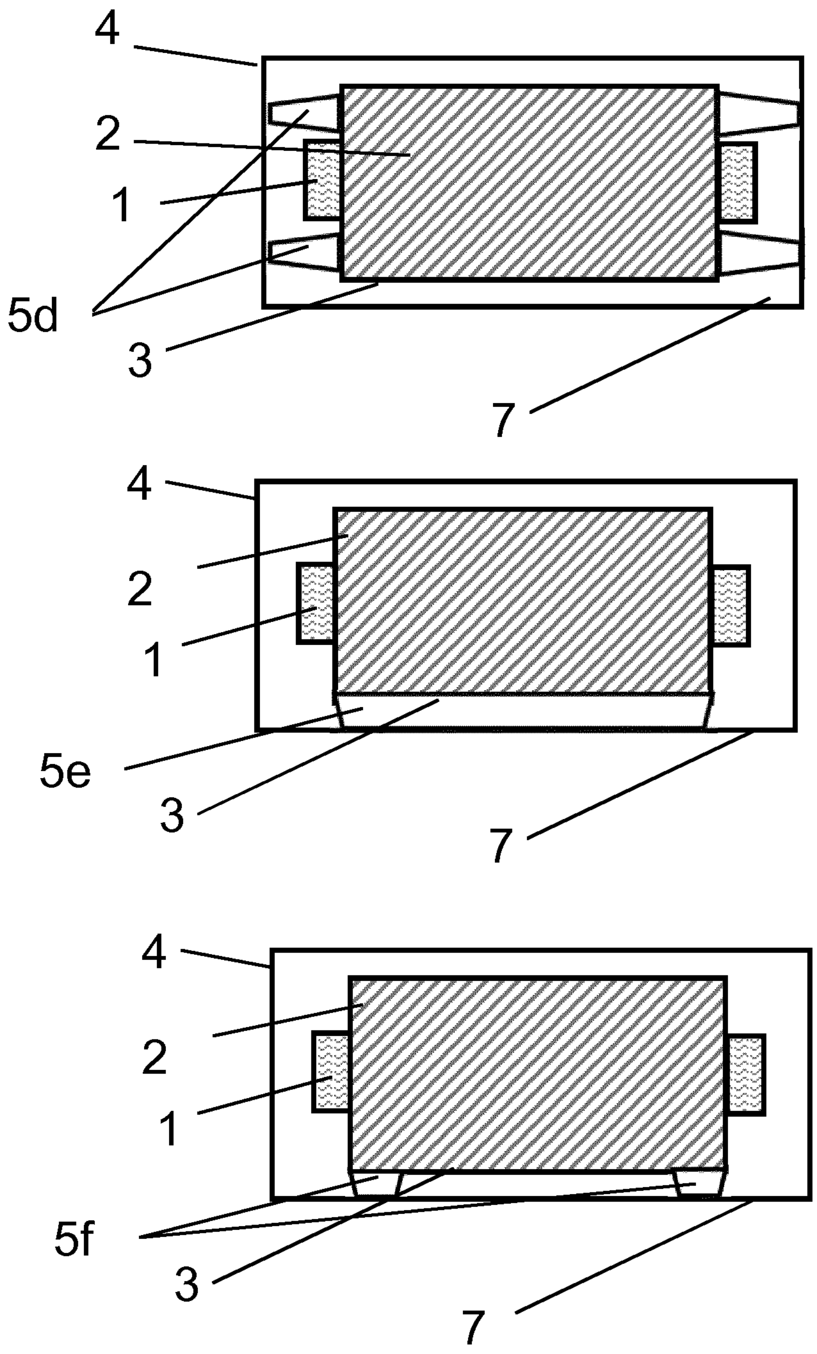
Figure 5:
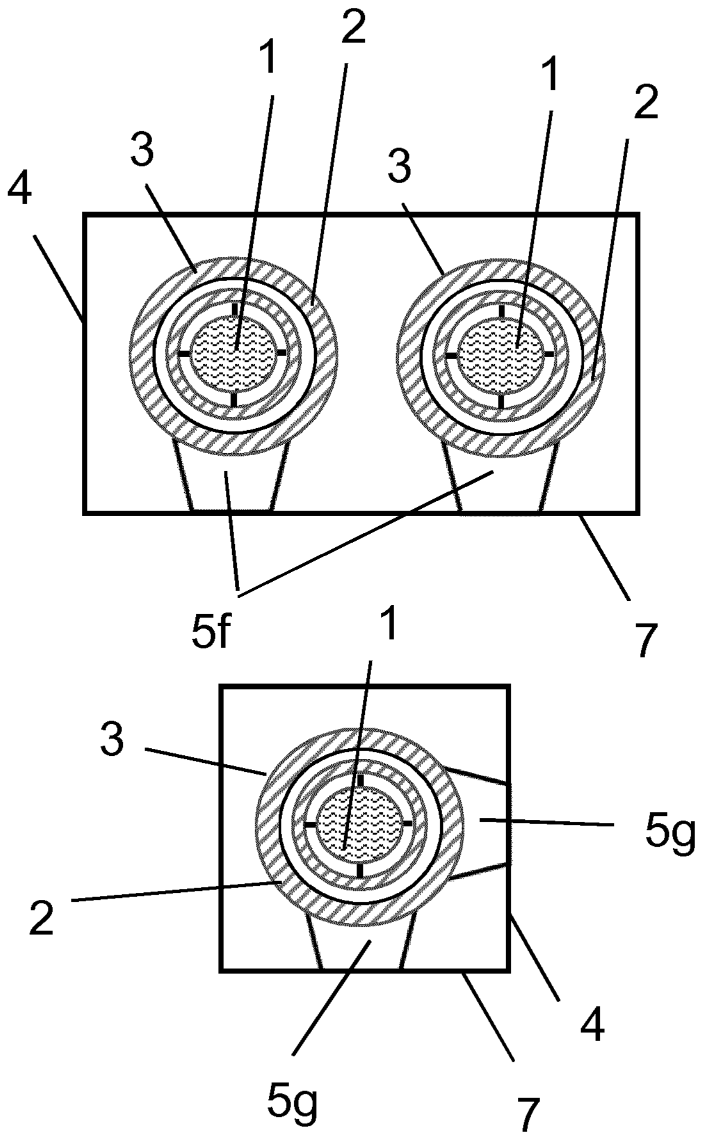
Figure 6:
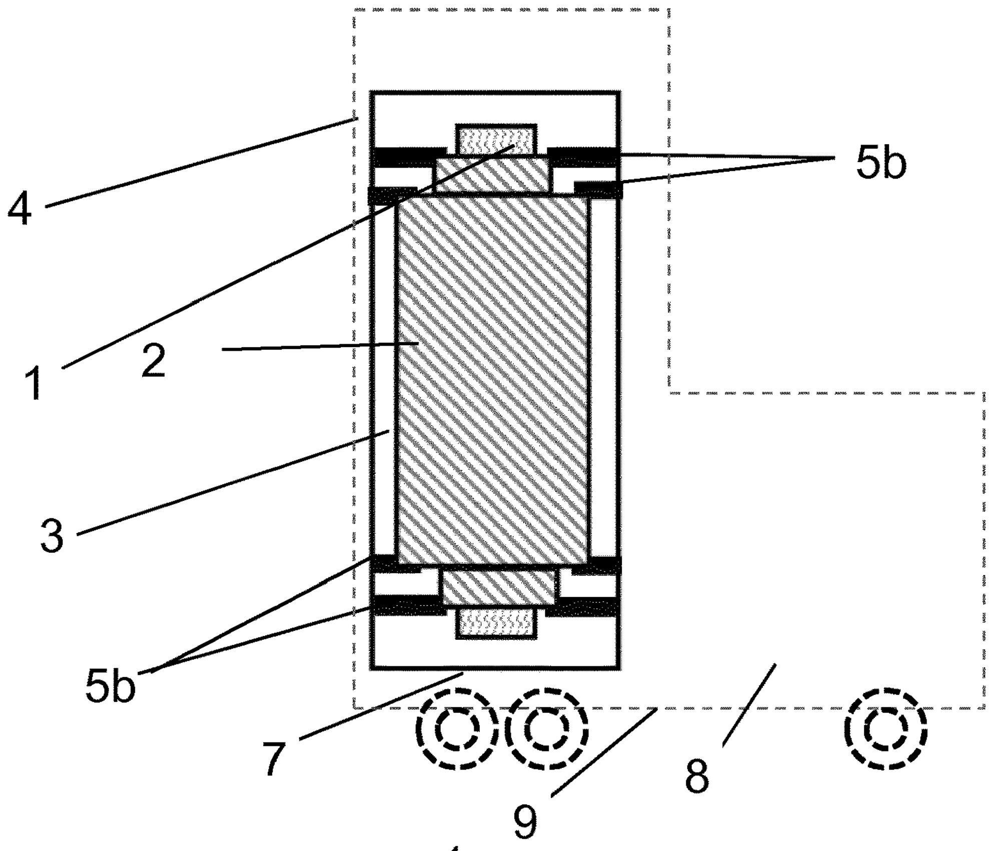
Figure 7:
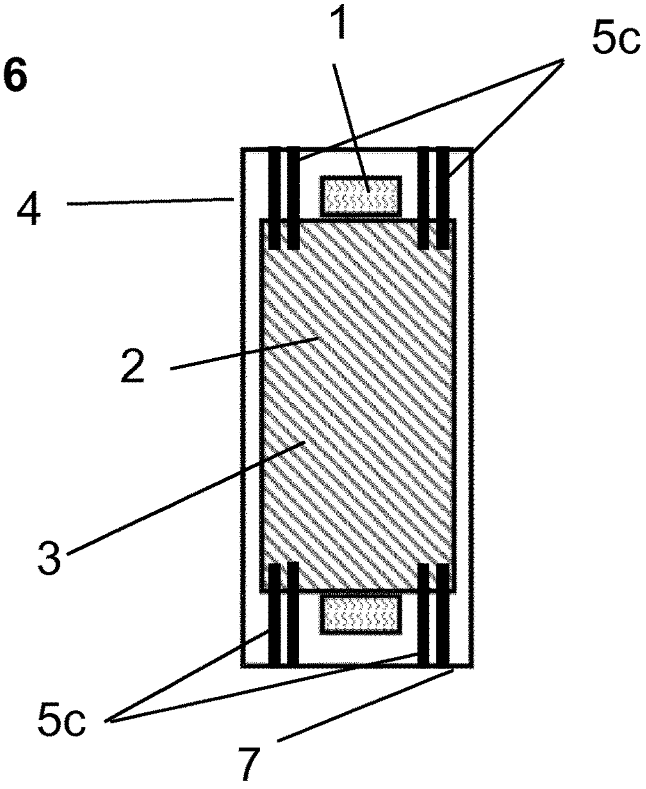
Figure 8:
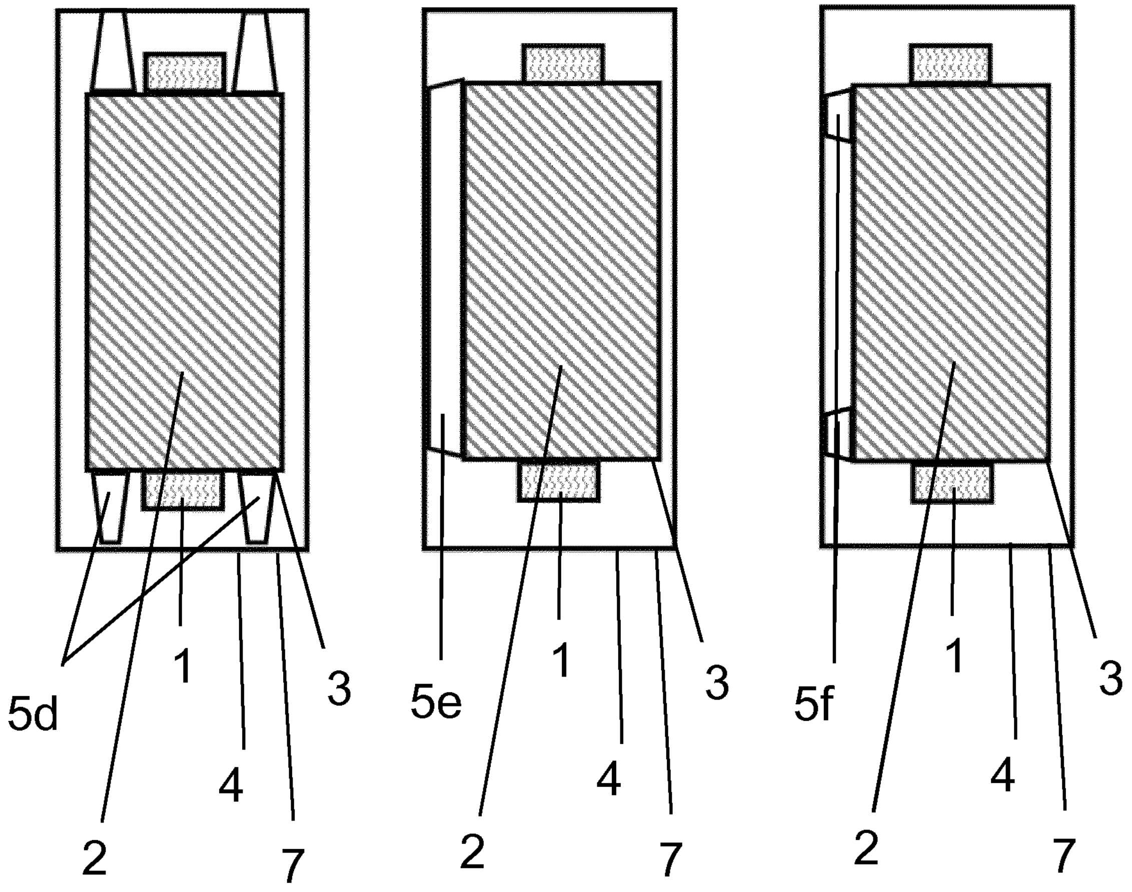
Figure 9:
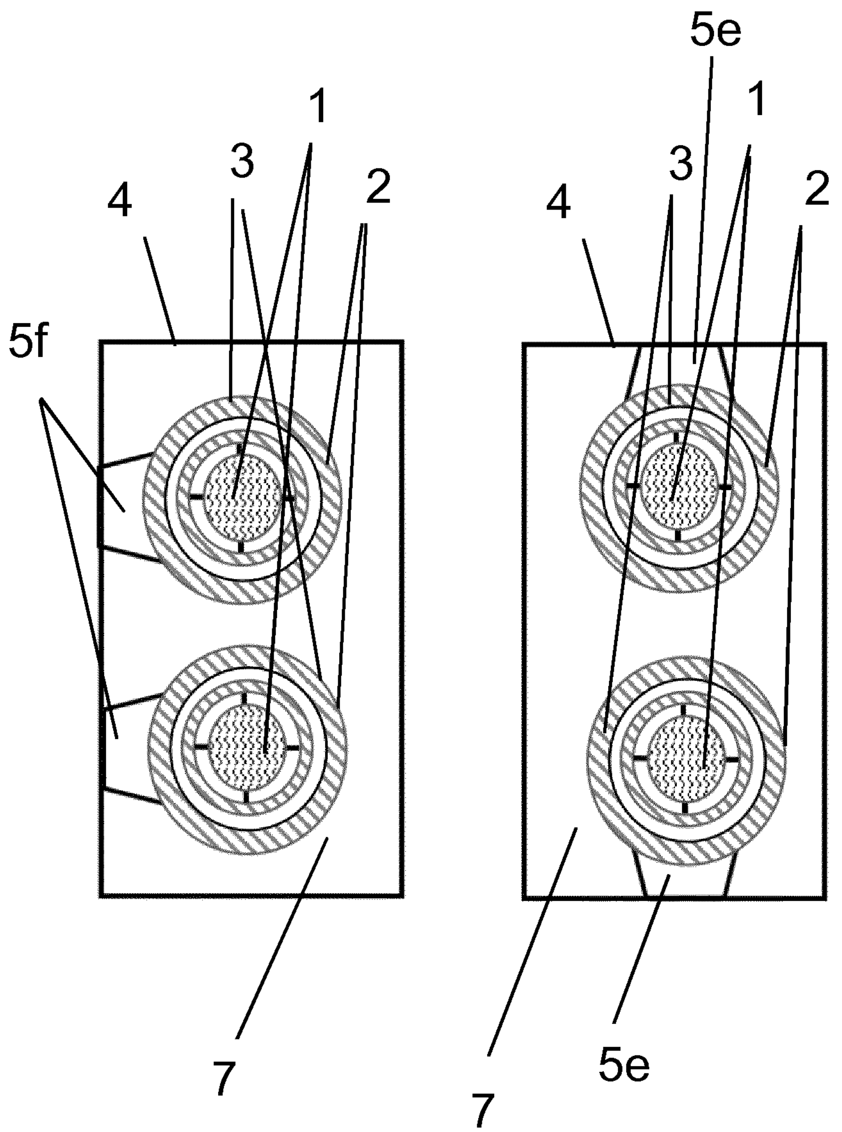

In the drawings:

FIG. 1 shows a side and a front view of horizontally arranged coils, which are connected with an outer support structure by plates, FIG. 2 shows horizontally arranged coils comprising two plates at each longitudinal end of the coils, FIG. 3 shows horizontally arranged coils with comb-shaped struts, which engage at each longitudinal end of the coils, wherein the struts are connected to an outer support structure, FIG. 4 shows side views of horizontally arranged coils with several different strut structures, FIG. 5 shows a front view of horizontally arranged coils with struts, wherein in the upper view struts are directed from the coils to a ground and wherein in the lower view one first leg of a strut is directed to the ground and one second leg of the strut is directed perpendicularly to the first strut, FIG. 6 shows vertically arranged coils with two plates at each longitudinal end of the coils, FIG. 7 shows vertically arranged coils with comb-shaped struta, which are connected to an outer support structure, FIG. 8 shows side views of vertically arranged coils with several strut structures, and FIG. 9 shows a top view of vertically arranged coils with struts, wherein in the left and the right view struts are directed from the coil to sides, which are parallel to the longitudinal extension of the coils.

FIG. 1 in the left view shows a dry transformer to install on or under or in a rail car 8 or power car of a train. The transformer comprises at least one core 1 and at least one winding 2, wherein the winding 2 surrounds the core 1 and wherein the core 1 and the winding 2 are parts of a coil 3.

The coil 3 and the core 1 and the winding 2 are mechanically connected to an outer support structure 4 by at least one strut 5*a*.

The strut 5*a* is made of an electrically insulating material. FIG. 1 in the right view shows that the strut 5*a* comprises at least one plate, which has at least one opening 6 or at least one recess, which at least partially surrounds the coil 3 and the outer winding 2 of the coil 3. The embodiment of FIG. 1 shows that several, namely two, coils 3 and windings 2 and cores 1 are arranged in parallel to each other and in parallel to a horizontally oriented plane 7.

The left view of FIG. 1 insofar shows an arrangement, comprising a transformer and a rail car 8 or a power car of a train, wherein the rail car 8 or power car comprises a ground plane 9, which is parallel to the rails, when the rail car 8 or power car is on the rails, and wherein the longitudinal extensions of the coil 3 and of the winding 2 and of the core 1 are oriented in parallel to the ground plane 9. The support structure 4 is connected to the rail car 8 or power car in a fixed manner.

FIG. 2 shows, that a strut 5*b* comprises two plates at one longitudinal end of a coil 3 and comprises two plates at the other longitudinal end of the coil 3.

FIGS. 1 and 2 show, that two coils 3 are fixed by means of insulation material to an outer support structure 4. Forces are received or absorbed in y-z-direction, this is best shown in the right view of FIG. 1.

FIG. 3 shows, that a strut 5*c* is comb-shaped and that the strut 5*c* at least partially extends in a direction, which is parallel to the extension of the core 1. The strut 5*c* is comb-shaped at one longitudinal end of the coil 3 and the strut 5*c* is comb-shaped at the other longitudinal end of the coil 3. FIG. 3 shows that a support structure 4 is used to fix the coils 3 in x-direction.

FIG. 4 shows in the upper view, that a strut 5*d* at one of its ends is connected with the coil 3 or the winding 2 on at least one outer side of the coil 3 or the winding 2 and that the strut 5*d* is connected at its other end with the outer support structure 4. The strut 5*d* comprises four legs, wherein two legs at each longitudinal end of the coil 3 protrude in the direction of the outer support structure 4 and are parallel to the longitudinal extension of the core 1 and of the coil 3.

FIG. 4 shows in the middle view, that a strut 5*e* at one of its ends is connected with the coil 3 or the winding 2 on at least one outer side of the coil 3 or the winding 2 and that the strut 5*e* is connected at its other end with the outer support structure 4. The strut 5*e* comprises only one leg, which is directed to the horizontally oriented plane 7.

FIG. 4 shows in the lower view, that a strut 5*f* at one of its ends is connected with the coil 3 or the winding 2 on at least one outer side of the coil 3 or the winding 2 and that the strut 5*f* is connected at its other end with the outer support structure 4. The strut 5*f* comprises two legs which are directed to the horizontally oriented plane 7.

The coils 3 of FIG. 4 are oriented in parallel to the horizontally oriented plane 7.

FIG. 5 shows in the upper view, that the strut 5*f* at one of its ends is connected with the coil 3 or the winding 2 on at least one outer side of the coil 3 or the winding 2 and that the strut 5*f* is connected at its other end with the outer support structure 4. The strut 5*f* comprises two legs which are directed to the horizontally oriented plane 7. Two coils 3 are arranged parallel to each other.

FIG. 5 shows in the lower view, that the strut 5*g* protrudes with one first leg from one side of the coil 3 or the winding 2 and protrudes with one second leg from another side of the coil 3 or the winding 2, wherein the directions of protruding of the legs are perpendicular to each other. The first leg protrudes in the direction of the horizontally oriented plane 7. The second leg protrudes in a direction to a side of the support structure 4, which is arranged perpendicularly to the horizontally oriented plane 7.

FIGS. 4 and 5 show that outer support structures 4 are connected to one or more sides of one or more coils 3. FIGS. 1 to 5 show that a winding 2 is connected with the core 1.

FIGS. 6 to 9 show, that the longitudinal extensions of several coils 3 and of windings 2 and of cores 1 are arranged in parallel to each other and perpendicularly to a horizontally oriented plane 7.

FIG. 6 insofar shows an arrangement, comprising a transformer and a rail car 8 or a power car of a train, wherein the rail car 8 or power car comprises a ground plane 9, which is parallel to the rails, when the rail car 8 or power car is on the rails, and wherein the longitudinal extensions of the coil 3 and of the winding 2 and of the core 1 are oriented perpendicularly to the ground plane 9.

FIG. 6 shows, that the strut 5*b* comprises two plates at one longitudinal end of the coil 3 and comprises two plates at the other longitudinal end of the coil 3. FIG. 6 shows that a coil 3 is attached by means of insulation material to an outer support structure 4. Stresses are received or absorbed in x-y-z direction.

FIG. 7 shows, that the strut 5*c* is comb-shaped and that the strut 5*c* at least partially extends in a direction, which is parallel to the extension of the core 1. The strut 5*c* is comb-shaped at one longitudinal end of the coil 3 and the strut 5*c* is comb-shaped at the other longitudinal end of the coil 3. FIG. 7 shows that an outer support structure 4 is used to fix the coils 3 in x-y-z direction.

FIG. 8 shows in the left view, that the strut 5*d* at one of its ends is connected with the coil 3 or the winding 2 on at least one outer side of the coil 3 or the winding 2 and that the strut 5*d* is connected at its other end with the outer support structure 4. The strut 5*d* comprises four legs, wherein two legs at each longitudinal end of the coil 3 protrude in the direction of the outer support structure 4 and are parallel to the longitudinal extension of the core 1. The legs at the bottom rest on the horizontally oriented plane 7.

FIG. 8 shows in the middle view, that the strut 5*e* at one of its ends is connected with the coil 3 or the winding 2 on at least one outer side of the coil 3 or the winding 2 and that the strut 5*e* is connected at its other end with the outer support structure 4. The strut 5*e* comprises only one leg, which is directed to a vertically oriented plane, which is perpendicular to the horizontally oriented plane 7.

FIG. 8 shows in the right view, that the strut 5*f* at one of its ends is connected with the coil 3 or the winding 2 on at least one outer side of the coil 3 or the winding 2 and that the strut 5*f* is connected at its other end with the outer support structure 4. The strut 5*f* comprises two legs, which are directed to a vertically oriented plane, which is perpendicular to the horizontally oriented plane 7.

FIG. 9 shows in the left view, that the strut 5*f* at one of its ends is connected with the coil 3 or the winding 2 on at least one outer side of the coil 3 or the winding 2 and that the strut 5*f* is connected at its other end with the outer support structure 4. The strut 5*f* comprises two legs, which are directed to a vertically oriented plane, which is perpendicular to the horizontally oriented plane 7. Two vertically arranged coils 3 are arranged in parallel to each other.

FIG. 9 shows in the right view, that the strut 5*e* protrudes from one side of the coil 3 or the winding 2 and rests on a first vertical plane, which is perpendicular to the horizontally oriented plane 7. Another strut 5*e* protrudes from one side of another coil 3 or the winding 2 and rests on another vertical plane, which is parallel to the first vertical plane and also perpendicular to the horizontally oriented plane 7. Two coils 3 are arranged vertically. The struts 5*e* protrude in opposite directions from the coils 3.

FIGS. 8 and 9 show that an outer support structure 4 is connected to one or more sides of one or more coils 3.

In this description two coils 3, two windings 2 or two cores 1 are arranged in parallel to each other and/or to a plane, if the longitudinal extensions of the coils 3, of the windings 2 or of the cores 1 are arranged in parallel to each other and/or to a plane.

In this description two coils 3, two windings 2 or two cores 1 are arranged in parallel to each other and perpendicularly to a plane, if the longitudinal extensions of the coils 3, of the windings 2 or of the cores 1 are arranged in parallel to each other and perpendicularly to a plane.

REFERENCE NUMBERS

1 Core
2 Winding
3 Coil
4 Outer support structure
5*a-f* Strut
6 Opening or recess
7 Horizontal plane
9 Rail car or power car

The invention claimed is:

1. A dry transformer to install on or under or in a vessel or a means of transportation comprising at least one core and at least one winding, wherein the winding surrounds the core and wherein the core and the winding are parts of a coil,
wherein the coil and/or the core and/or the winding are mechanically connected to an outer support structure by at least one strut;
wherein the strut comprises at least one plate which has at least one opening or at least one recess, which at least partially surrounds the coil and/or an outer winding of the coil and/or the core; and
wherein the strut comprises two plates at one longitudinal end of the coil and comprises two plates at the other longitudinal end of the coil.

2. A dry transformer according to claim 1, wherein the strut is made of an electrically insulating material or that the strut comprises an electrically insulating material.

3. A dry transformer according to claim 1, wherein the strut is comb-shaped and/or the strut at least partially extends in a direction, which is parallel to the longitudinal extension of the core.

4. A dry transformer according to claim 3, wherein the strut is comb-shaped at one longitudinal end of the coil and that the strut is comb-shaped at the other longitudinal end of the coil.

5. A dry transformer according to claim 1, wherein the strut at one of its ends is connected with the coil or the winding on at least one outer side of the coil or the winding and that the strut is connected at its other end with the outer support structure.

6. A dry transformer according to claim 5, wherein the strut protrudes with one first leg from one side of the coil or the winding and protrudes with one second leg from another side of the coil or the winding, wherein the directions of protruding of the legs are perpendicular to each other.

7. A dry transformer according to claim 1, wherein the winding is wound directly onto the core.

8. A dry transformer according to claim 1, wherein the winding is connected with the core and/or the winding is wedged to the core.

9. A dry transformer according to claim 1, wherein several coils and/or windings and/or cores are arranged in parallel to each other and in parallel to a horizontally oriented plane.

10. A dry transformer according to claim 1, wherein several coils and/or windings and/or cores are arranged in parallel to each other and perpendicularly to a horizontally oriented plane.

11. An arrangement, comprising a transformer according to claim 1 and a vessel or means of transportation comprising a rail car or a power car of a train or a ship, wherein the vessel or means of transportation comprises a ground plane which is arranged almost horizontally, wherein the ground plane is arranged parallel to rails, when the rail car or power car is on the rails, and wherein the coil and/or the winding and/or the core is/are oriented in parallel to the ground plane.

12. An arrangement, comprising a transformer according to claim 1 and a vessel or means of transportation comprising a rail car or a power car of a train or a ship, wherein the vessel or means of transportation comprises a ground plane which is arranged almost horizontally, wherein the ground plane is arranged parallel to rails, when the rail car or power car is on the rails, and wherein the coil and/or the winding and/or the core is/are oriented perpendicularly to the ground plane.

13. An arrangement according to claim 11, wherein the outer support structure is connected to the vessel or means of transportation in a fixed manner and/or that the outer support structure fixes at least one coil in three directions, namely in x-direction, in y-direction and in z-direction.

* * * * *